United States Patent
Wakatsuki et al.

(10) Patent No.: US 9,857,217 B2
(45) Date of Patent: Jan. 2, 2018

(54) OPTO-ELECTRONIC INTEGRATED CIRCUIT, ARRAY ANTENNA TRANSMITTER, ARRAY ANTENNA RECEIVER, AND TRANSMITTER

(71) Applicants: Atsushi Wakatsuki, Tokyo (JP); Tadao Ishibashi, Kanagawa (JP)

(72) Inventors: Atsushi Wakatsuki, Tokyo (JP); Tadao Ishibashi, Kanagawa (JP)

(73) Assignees: NIPPON TELEGRAPH AND TELEPHONE CORPORATION, Tokyo (JP); NTT ELECTRONICS CORPORATION, Kanagawa (JP)

(*) Notice: Subject to any disclaimer, the term of this patent is extended or adjusted under 35 U.S.C. 154(b) by 548 days.

(21) Appl. No.: 14/346,312

(22) PCT Filed: Sep. 21, 2012

(86) PCT No.: PCT/JP2012/074187
§ 371 (c)(1),
(2) Date: Mar. 20, 2014

(87) PCT Pub. No.: WO2013/042762
PCT Pub. Date: Mar. 28, 2013

(65) Prior Publication Data
US 2014/0231627 A1   Aug. 21, 2014

(30) Foreign Application Priority Data

Sep. 22, 2011   (JP) ................................. 2011-206848

(51) Int. Cl.
*G01J 1/44* (2006.01)
*G02F 2/00* (2006.01)
(Continued)

(52) U.S. Cl.
CPC ................ *G01J 1/44* (2013.01); *G02F 2/002* (2013.01); *H01Q 3/2676* (2013.01); *H04B 7/06* (2013.01);
(Continued)

(58) Field of Classification Search
CPC ........ G01J 1/42; G01J 1/44; G01J 2001/4446; G01J 2001/446; G01J 2001/448;
(Continued)

(56) References Cited

U.S. PATENT DOCUMENTS 4,739,334 A   4/1988   Soref
5,333,000 A   7/1994   Hietala et al.
(Continued)

FOREIGN PATENT DOCUMENTS

JP   2007-067802 A   3/2007

OTHER PUBLICATIONS

Shimizu et al., "Photodiode—integrated microstrip antenna array for subterahertz radiation", IEEE Photonics Technology Letters, vol. 18, No. 6, Mar. 15, 2006, pp. 743-745.
(Continued)

*Primary Examiner* — Bernarr E Gregory
(74) *Attorney, Agent, or Firm* — Blakely Sokoloff Taylor & Zafman LLP (57) ABSTRACT

An opto-electronic integrated circuit includes an optical splitter (12, 13A, 13B) formed on a substrate, the optical splitter branching an input optical signal into N (N is an integer of 2 or more) optical signals, and outputting the optical signals, and N optical phase modulators (15A-15D) formed on the substrate for the respective optical signals output from the optical splitter, the optical phase modulators adjusting the phases of the optical signals based on a phase
(Continued)

modulation characteristic in which the phase change amount changes depending on the wavelength of light, and output the optical signals.

9 Claims, 7 Drawing Sheets

(51) Int. Cl.
  *H01Q 3/26* (2006.01)
  *H04B 7/06* (2006.01)
  *H04B 7/08* (2006.01)
  *H04B 10/90* (2013.01)
(52) U.S. Cl.
  CPC ............... *H04B 7/08* (2013.01); *H04B 10/90* (2013.01); *G01J 2001/446* (2013.01); *G01J 2001/448* (2013.01); *G02F 2002/008* (2013.01); *G02F 2201/06* (2013.01); *G02F 2203/13* (2013.01); *G02F 2203/50* (2013.01); *G02F 2203/58* (2013.01); *H04B 2210/006* (2013.01)
(58) Field of Classification Search
  CPC ... H04B 7/02; H04B 7/04; H04B 7/06; H04B 7/08; H04B 2210/006; H04B 10/90; H04B 10/50; H04B 10/501; H04B 10/502; H04B 10/516; H04B 10/54; H04B 10/541; H01Q 3/26; H01Q 3/2676; G02F 2/002; G02F 2201/06; G02F 2/004; G02F 2002/008; G02F 2203/13; G02F 2203/50; G02F 2203/58
  See application file for complete search history.

(56) References Cited

U.S. PATENT DOCUMENTS

| | | | | |
|---|---|---|---|---|
| 5,543,805 A | * | 8/1996 | Thaniyavarn | H01Q 3/2676 342/368 |
| 5,751,248 A | | 5/1998 | Thaniyavarn | |
| 7,929,864 B2 | * | 4/2011 | Chen | H01Q 3/2676 398/115 |
| 8,498,542 B2 | * | 7/2013 | Frankel | H04B 10/541 398/184 |
| 2004/0208644 A1 | * | 10/2004 | Sirat | H04B 10/502 398/186 |

OTHER PUBLICATIONS

Ito et al., "Photonic millimetre-and sub-millimetrewave generation using J-band rectangularwaveguide-output uni-travelling-carrier photodiode module", Electronics Letters (2005), Nov. 23, 2006 vol. 42 No. 24, pp. 1424-1425.

Itakura, et al., "High-Current Backside-Illuminated Photodiode Array Module for Optical Analog Links", Journal of Lightwave Technology, vol. 28, Issue 6, pp. 965-971 (2010).

Fu et al., "Photodiodes With Monolithically Integrated Wilkinson Power Combiner", IEEE Journal of Quantum Electronics, vol. 46, No. 4, Apr. 2010, pp. 541-545.

Stulemeijer, "Photonic chip for steering a four element phased array antenna", International Topical Meeting on Microwave Photonics MWP 2000, Sep. 2000, pp. 20-22.

* cited by examiner

OPTO-ELECTRONIC INTEGRATED CIRCUIT, ARRAY ANTENNA TRANSMITTER, ARRAY ANTENNA RECEIVER, AND TRANSMITTER

TECHNICAL FIELD

The present invention relates to an optical signal processing circuit technique of distributing a phase-controlled modulated optical signal to a plurality of OE conversion devices which operate to generate a terahertz (THz) wave, or transmit or receive a signal.

BACKGROUND ART

As a method of generating a continuous terahertz wave, OE conversion (Optical to Electrical conversion) by a photoconductive device or photodiode has recently received attention because of a wide frequency range. A frequency multiplier using a nonlinear diode element has been employed conventionally for a high frequency region (>300 GHz) in which a transistor amplifier cannot reach. However, the frequency multiplier is not always suited to a wide variety of applications because, for example, the bandwidth is generally narrow and the signal modulation device configuration is complicated.

If a beat signal of two optical modes, in which two laser beam outputs (light wavelengths: $\lambda 1$ and $\lambda 2$) are combined by making their polarizations match each other, are OE-converted, a terahertz wave can be easily extracted as a difference frequency between them. Since the optical beat signal can be used, the usable wavelength range is very wide, as described above.

However, a maximum terahertz wave output which can be generated by one OE conversion device is generally limited owing to restrictions accompanying the frequency characteristic of a device and heat generation. For this reason, a technique of generating a higher terahertz wave output by power combining is desired especially in an application of signal transmission. It is also fundamentally important to increase an output from a terahertz wave light source, in order to shorten the observation time of terahertz wave imaging. The power combining includes a method of combining terahertz wave outputs from respective OE conversion devices on an electrical line, and a method of directly connecting antennas to OE conversion devices. In the latter method, a so-called phased array antenna can be configured, so various functions can be given by controlling the radiation pattern.

Efficient detection of terahertz wave imaging becomes possible by supplying local signals to many OE conversion devices even in homodyne detection and heterodyne detection using the nonlinearity of the OE conversion devices. Also, a wireless system using a phased array antenna can be built.

In any case, when a terahertz wave signal is generated or received using many OE conversion devices, a technique of distributing a controlled optical beat signal to the respective OE conversion devices is fundamentally important.

Figure 6:
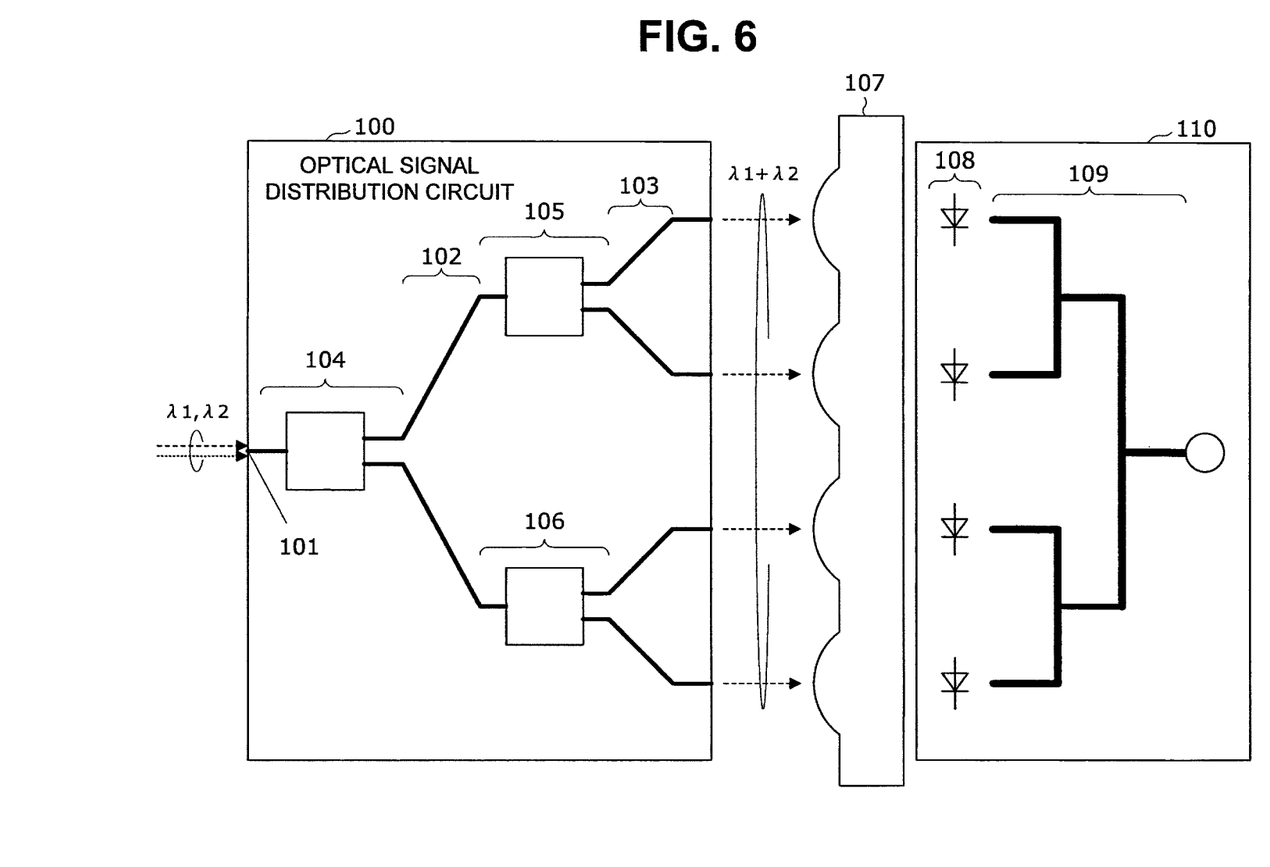
FIG. 6 is a schematic view showing an optical signal distribution circuit fabricated by the PLC technique.

Generally in terahertz wave power combining, an optical signal distribution circuit 100 is used to supply a plurality of branched optical beat signals to a plurality of OE conversion devices and combine generated terahertz waves. As shown in FIG. 6, an optical beat signal input obtained by multiplexing a $\lambda 1$ signal and $\lambda 2$ signal is coupled to an input waveguide port 101, and then branched into four by series-connected 1×2 optical splitters 104, 105, and 106 in two stages on connection waveguides 102.

After that, optical beat signals output from the 1×2 optical splitters 105 and 106 via output waveguides 103 are coupled to photodiodes 108 via an optical lens array 107. Terahertz wave outputs from the photodiode 108 are power-combined by a circuit on electrical lines 109. It is easy at the accuracy of terahertz wavelength level to equalize waveguide lengths from the optical input port to output port of a PLC (Planar Lightwave Circuit). The phases of terahertz wave outputs from the photodiodes can be controlled to be uniform.

The photodiodes and power combining circuit can be integrated on a single substrate 110. The combined terahertz wave power is coupled to, e.g., a metal waveguide and emitted finally to the space. In addition to the power combining using the electrical line as shown in FIG. 6, terahertz wave outputs from respective photodiodes can be directly coupled to one of many arrayed antennas to combine powers as an array antenna output. An optical signal distribution circuit similar to one in FIG. 6 can be used for an application in which the phases of terahertz waves output from the respective antennas are fixed.

RELATED ART LITERATURE

Non-Patent Literature

Non-Patent Literature 1: N. Shimizu, T. Nagatsuma, "Photodiode-integrated microstrip antenna array for subterahertz radiation", IEEE Photonics Technology Letters, VOL. 18, NO. 6, Mar. 15, 2006, pp. 743-745

Non-Patent Literature 2: H. Ito, T. Furuta, Y. Muramoto, T. Ito, T. Ishibashi, "Photonic millimeter- and sub-millimeter-wave generation using J-band rectangular-waveguide-output uni-travelling-carrier photodiode module", Electronics Letters (2005), 23 Nov. 2006 Vol. 42, No. 24, pp. 1424-1425

Non-Patent Literature 3: Shigetaka Itakura, Kiyohide Sakai, Tsutomu Nagatsuka, Eitaro Ishimura, Masaharu Nakaji, Hiroshi Otsuka, Kazutomi Mori, and Yoshihito Hirano, "High-Current Backside-Illuminated Photodiode Array Module for Optical Analog Links", Journal of Lightwave Technology, Vol. 28, Issue 6, pp. 965-971 (2010)

Non-Patent Literature 4: Yang Fu, Huapu Pan, Campbell, J. C., "Photodiodes With Monolithically Integrated Wilkinson Power Combiner", IEEE Journal of Quantum Electronics, Vol. 46, NO. 4, April 2010, pp. 541-545

DISCLOSURE OF INVENTION

Problem to be Solved by the Invention

In the conventional technique, when an optical signal distribution circuit is used to distribute a phase-controlled optical beat signal to a plurality of devices which operate to generate a terahertz wave, or transmit or receive a signal, the optical signal distribution circuit becomes complicated, and the optical beat state is degraded owing to the use of a fiber amplifier.

In the above-described conventional technique, an optical signal distribution circuit including an optical phase modulator is required to construct a phased array antenna which controls the radiation direction by changing the phases of terahertz wave signals from respective antennas. More specifically, the phase of an optical beat signal is changed by adjusting the phases of the $\lambda 1$ signal and $\lambda 2$ signal using the optical phase modulator. A conventional typical optical signal distribution circuit needs to independently modulate optical signals of the λ1 signal and λ2 signal, combine them, and change them to the optical beat state.

Figure 7:
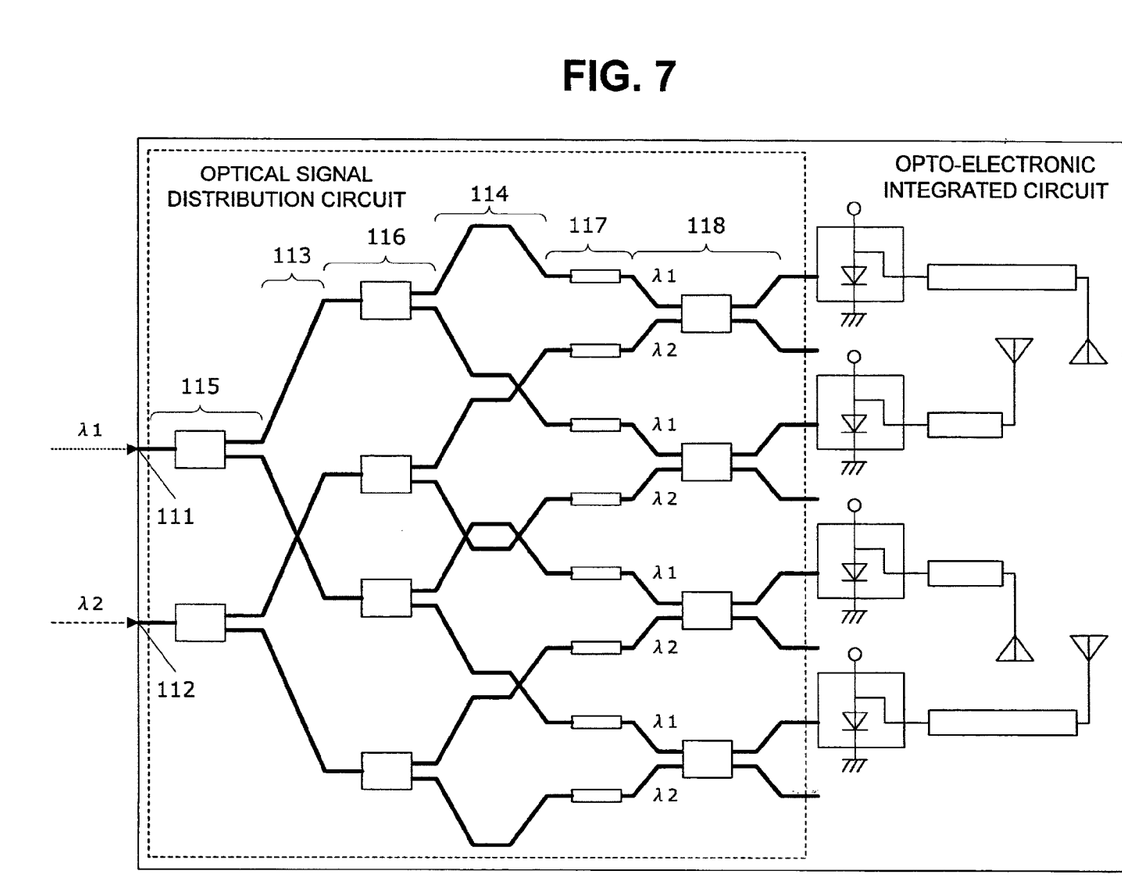
FIG. 7 is a circuit diagram showing a conventional opto-electronic integrated circuit.

More specifically, to obtain four independent optical beat signals, an optical signal distribution circuit as shown in FIG. 7 is used in an opto-electronic integrated circuit.

First, a λ1 signal and λ2 signal respectively introduced from optical beat signal input ports 111 and 112 are branched into four by 1×2 optical splitters 115 and 116 in two stages which are connected by connection waveguides 113. Further, the λ1 signals and λ2 signals pass through eight phase modulators 117 via connection waveguides 114, independently adjusting the phases of a total of eight waves of the λ1 signals and λ2 signals. Finally, the λ1 and λ2 signals are multiplexed by four 3-dB couplers 118, obtaining eight optical beat signals.

Each 3-dB coupler outputs two optical beat signals. In terms of the optical power amplitude, the phases of these optical beat signals are fixed in opposite phase states regardless of the phase relationship between the λ1 signal and the λ2 signal.

Figure 8:
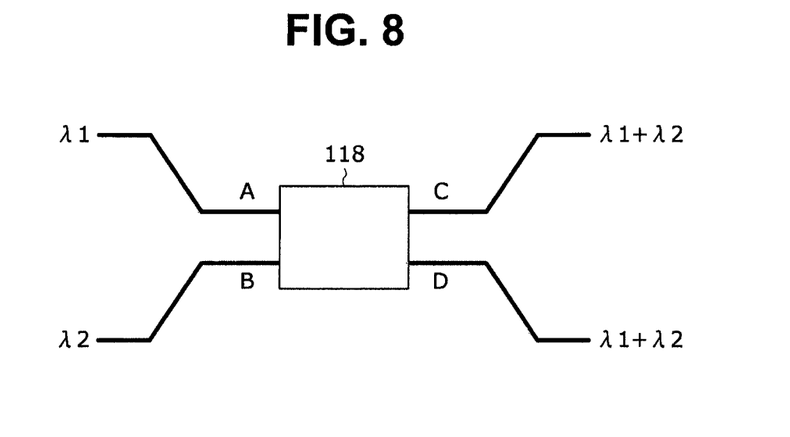
FIG. 8 is an explanatory view showing a 3-dB coupler.
Figure 9:
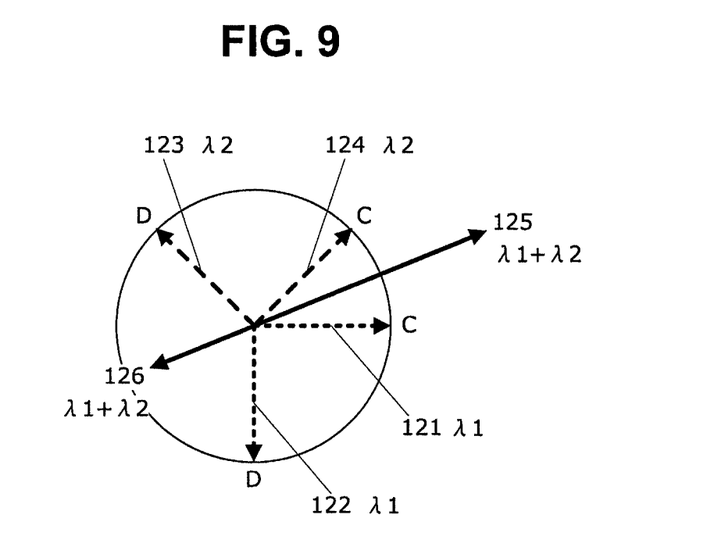
FIG. 9 is an explanatory view showing the phase relationship of the 3-dB coupler.

Assume that the λ1 signal is introduced into the 3-dB coupler 118 from a port A and the λ2 signal is introduced from a port B, as shown in FIGS. 8 and 9. Owing to the characteristic of the 3-dB coupler 118, the optical phase of a λ1 signal output 122 at a port D delays by π/2 from a λ1 signal output 121 passing from the port A to a port C. Similarly, the optical phase of a λ2 signal output 124 at the port C delays by π/2 from a λ2 signal output 123 at the port D.

Thus, the amplitudes of the optical beat signals become opposite to each other in accordance with λ1+λ2 electric fields 125 and 126 multiplexed at the port C and port D. Since the beat phases of outputs at the port C and port D are not independent, these outputs cannot serve as beat power supply sources to independent antennas. In the exemplified optical signal distribution circuit, only optical beat signals of four in-phase waves out of eight optical beat signals can be obtained though many splitters, modulators, and 3-dB couplers are used. The optical signal distribution circuit requires a wide optical integrated circuit area, resulting in poor efficiency.

When the number of branches is large, and the optical powers of the λ1 signal and λ2 signal are amplified in advance using a fiber amplifier or the like, two amplifies are necessary as long as the conventional optical signal distribution circuit is used. If independent fiber amplifiers are used, the optical beat state degrades owing to the instability of the relative light polarization state. If the polarization adjustment function is mounted on the optical signal distribution circuit, the circuit size further increases.

The present invention has been made to solve the above problems, and has as its object to provide an optical signal processing circuit technique of implementing simplification and size reduction of the circuit configuration.

Means of Solution to the Problem

In order to achieve the above-described object, according to the present invention, there is provided an opto-electronic integrated circuit comprising an optical splitter formed on a substrate, the optical splitter branching an input optical signal into N (N is an integer of not less than 2) optical signals, and outputting the optical signals, and N optical phase modulators formed on the substrate for the respective optical signals output from the optical splitter, the optical phase modulators adjusting phases of the optical signals based on a phase modulation characteristic in which a phase change amount changes depending on a wavelength of light, and outputting the optical signals.

According to the present invention, there is also provided an array antenna transmitter comprising an optical splitter formed on a substrate, the optical splitter branching an input optical signal into N (N is an integer of not less than 2) optical signals, and outputting the optical signals, N optical phase modulators formed on the substrate for the respective optical signals output from the optical splitter, the optical phase modulators adjusting phases of the optical signals based on a phase modulation characteristic in which a phase change amount changes depending on a wavelength of light, and outputting the optical signals, N photodiodes formed on the substrate for the respective optical phase modulators, the photodiodes outputting electrical signals obtained by OE-converting the optical signals that have been output from the optical phase modulators and have individual phases, and N antenna devices formed on the substrate for the respective photodiodes, the antenna devices operating as a phased array antenna as a whole by radio-transmitting the electrical signals that have been output from the photodiodes and have individual phases.

According to the present invention, there is also provided an array antenna receiver comprising an optical splitter which is formed on a substrate, branches an input optical signal into N (N is an integer of not less than 2) optical signals, and outputs the optical signals, N optical phase modulators which are formed on the substrate for the respective optical signals output from the optical splitter, adjust phases of the optical signals based on a phase modulation characteristic in which a phase change amount changes depending on a wavelength of light, and output the optical signals, N photodiodes which are formed on the substrate for the respective optical phase modulators, and output electrical signals obtained by OE-converting the optical signals that have been output from the optical phase modulators and have individual phases, N antenna devices which are formed on the substrate for the respective photodiodes, and operate as a phased array antenna as a whole, and N electrical input/output circuits which are formed on the substrate for the respective photodiodes, demodulate, by the electrical signals that have been output from the photodiodes and have individual phases, received signals radio-received by the antenna devices, and output obtained demodulation signals.

According to the present invention, there is also provided a transmitter comprising an optical splitter formed on a substrate, the optical splitter branching an input optical signal into N (N is an integer of not less than 2) optical signals, and outputting the optical signals, N optical phase modulators formed on the substrate for the respective optical signals output from the optical splitter, the optical phase modulators adjusting phases of the optical signals based on a phase modulation characteristic in which a phase change amount changes depending on a wavelength of light, and outputting the optical signals, N photodiodes formed on the substrate for the respective optical phase modulators, the photodiodes outputting electrical signals obtained by OE-converting the optical signals that have been output from the optical phase modulators and have individual phases, N electrical input/output circuits formed on the substrate for the respective photodiodes, the electrical input/output circuits outputting transmission signals obtained by modulating, by input modulation signals, the electrical signals that have been output from the photodiodes and have individual phases, and power combining lines formed on the substrate, the power combining lines power-combining and outputting the N transmission signals output from the electrical input/output circuits.

Effect of the Invention

According to the present invention, the opto-electronic integrated circuit can control the relative phase difference between two optical signals of different wavelengths contained in an input optical beat signal, and input the optical beat signal in the optical beat state in which these optical signals are multiplexed. Since only one fiber amplifier suffices when amplifying an optical signal, a polarization adjustment unit can be omitted.

Thus, degradation of the optical beat state accompanying the fiber amplifier can be suppressed, and a stable optical beat signal can be generated. The numbers of circuits such as optical splitters, 3-dB couplers, and phase modulators can be almost halved, simplifying the optical signal distribution circuit. The chip size can be reduced, and photodiodes and array antennas can be integrated on a common substrate. As a result, a compact, stable communication high-output signal source, a terahertz wave array antenna device, or a higher-sensitivity receiver using the nonlinear operation of a photodiode can be implemented.

BEST MODE FOR CARRYING OUT THE INVENTION

Embodiments of the present invention will now be described with reference to the accompanying drawings.
[First Embodiment]
First, an opto-electronic integrated circuit 10 according to the first embodiment of the present invention will be described with reference to FIG. 1.

The whole opto-electronic integrated circuit 10 has a function of distributing a phase-controlled modulated optical signal to a plurality of OE conversion devices which operate to generate a terahertz (THz) wave, or transmit or receive a signal.

As an example of the opto-electronic integrated circuit 10, the embodiment will explain an array antenna transmitter which uses photodiodes as OE conversion devices and supplies phase-controlled terahertz waves from these photodiodes to respective antennas, thereby constructing a phased array antenna.

Figure 1:
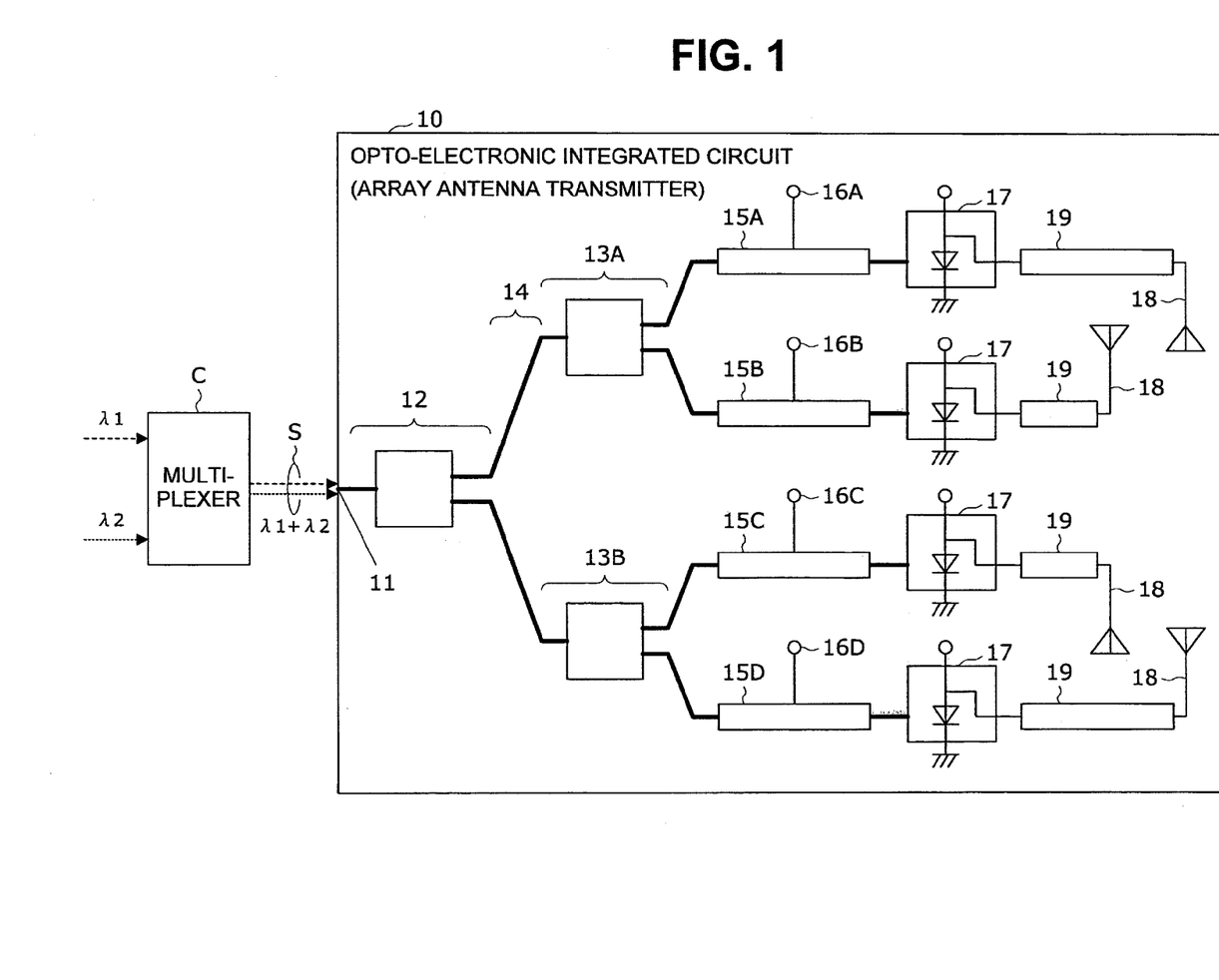
FIG. 1 is a circuit diagram showing the configuration of an opto-electronic integrated circuit according to the first embodiment.

In the configuration example of FIG. 1, a basic circuit for distributing an optical signal to obtain four independent phase-controlled optical beat signals, photodiodes serving as OE conversion devices, and antennas are integrated on one substrate.

The opto-electronic integrated circuit 10 according to the embodiment can be fabricated on, e.g., a compound semiconductor InP substrate. As main circuit units, an optical beat signal input port 11, 1×2 optical splitters 12, 13A, and 13B, connection waveguides 14, optical phase modulators 15A to 15D having wavelength dispersion, phase control voltage terminals 16A to 16D, photodiodes 17 including bias circuits and output circuits, antenna devices 18, and electrical lines 19 which connect the outputs of the photodiodes and the antenna devices are integrated on the InP substrate.

The 1×2 optical splitters 12, 13A, and 13B have a function of branching an optical beat signal (input optical signal) S input from the optical beat signal input port 11 into N (N is an integer of 2 or more; in the embodiment, N=4) optical signals and outputting them.

The optical phase modulators 15A to 15D are arranged for the respective optical signals, and have a function of adjusting the phases of the optical signals based on a phase modulation characteristic in which the phase change amount changes depending on the wavelength of light, and outputting the optical signals.

The photodiodes (OE conversion devices) 17 are arranged for the respective optical phase modulators 15A to 15D, and have a function of outputting electrical signals obtained by OE-converting optical signals which have been output from the optical phase modulators 15A to 15D and have individual phases.

The antenna devices 18 are arranged for the respective OE conversion devices 17, and have a function of operating as a phased array antenna as a whole by radio-transmitting electrical signals which have been output from the corresponding OE conversion devices and have individual phases.

Of these circuit units, the 1×2 optical splitters 12, 13A, and 13B, the connection waveguides 14, the optical phase modulators 15A to 15D, and the phase control voltage terminals 16A to 16D construct an optical signal distribution circuit. Optical waveguide lengths from the optical beat signal input port 11 to the optical phase modulators 15A to 15D are designed to be equal.

The fabrication of the opto-electronic integrated circuit 10 is based on a technique of fabricating a semiconductor Mach-Zehnder interferometer in which a waveguide-shaped splitter and 3-dB coupler are mounted (see, e.g., non-patent literature 1).

As a structure from the 1×2 optical splitters 12, 13A, and 13B to the optical phase modulators 15A to 15D, a double hetero structure (including a core layer and clad layer) epitaxially grown on a semi-insulating InP substrate is processed, forming a waveguide, Y branch, multimode interferometer (MMI), phase modulation waveguide, and the like. There are a mesa waveguide, buried waveguide, ridge waveguide, and the like, and an appropriate one of them is selected in accordance with the purpose.

In a region where the photodiodes 17, electrical lines 19, and antenna devices 18 are to be mounted, the above-mentioned double hetero structure is etched away, and a photodiode structure is epitaxially regrown adjacently to the double hetero structure. Thanks to the adjacent photodiode structure, an optical signal introduced from the optical waveguide is coupled to the light absorbing layer of the photodiode to induce a photocurrent. The photodiode 17 is formed by mesa processing. The electrical line 19 and antenna device 18 are formed by removing the photodiode structure and performing patterning on semi-insulating InP. A device forming technique for the electrical portion is the same as a well-known typical fabrication technique except that one side surface of the photodiode contacts the optical waveguide, i.e., the output of a corresponding one of the optical phase modulators 15A to 15D.

[Operation in First Embodiment]

Next, the operation of the optical signal distribution circuit in the opto-electronic integrated circuit 10 according to the embodiment will be explained.

The optical beat signal S obtained by multiplexing optical signals of two wavelengths λ1 and λ2 by a multiplexer C is introduced from the optical beat signal input port 11, and branched into four optical signals by the 1×2 optical splitters 12, 13A, and 13B formed from multimode interferometers in two stages. These optical signals in the optical beat state pass through the optical phase modulators 15A to 15D and are coupled to the four photodiodes 17.

The conventional typical optical signal distribution circuit (see FIG. 7) performs optical phase modulation for the λ1 signal and λ2 signal in the monochromatic state, and then multiplexes the λ1 signal and λ2 signal. Unlike this, the opto-electronic integrated circuit 10 according to the embodiment performs optical phase modulation in an optical beat state in which the λ1 signal and λ2 signal are multiplexed. Compared to the conventional optical signal distribution circuit (see FIG. 7) which controls the phase of the optical beat, the number of 1×2 optical splitters or 3-dB couplers used and the number of optical phase modulators 15A to 15D used are almost halved.

When optical phase modulation is performed in a state in which the two wavelengths of the λ1 signal and λ2 signal are mixed, how the phase of the optical beat signal changes is important. For example, a semiconductor modulator generally has slight wavelength dispersion in the phase modulation characteristic. That is, the optical phase change amount differs between the λ1 signal and the λ2 signal. The relative difference in optical phase change means that the phase of the optical beat signal also changes. This phenomenon poses a problem such as generation of signal distortion in optical microwave communication, but effective utilization of it has not been discussed.

The present inventors have considered dispersion of phase modulation in a semiconductor modulator, that is, when other parameters are used, the relationship between the wavelength dependence of a half-wave voltage (Vπ) and the phase change of beat power. As a result, the present inventors have found that, when the beat frequency enters the terahertz wave region, effective optical beat phase adjustment becomes possible.

Letting k1 and k2 be the wave numbers of the λ1 signal and λ2 signal in the phase modulator, Lwg be the length of the modulator to which a phase modulation voltage is applied, and φ be the phase delay of the λ2 signal with respect to the λ1 signal at the time of input to the modulator, power P at the output terminal of the modulator is given by:

[Mathematical 1]

$$P = P0 \times |E0 \times [\exp(j\omega 1 t - jk1 \times Lwg) + \\ \exp(j\omega 2 t - jk2 \times Lwg - j\phi)]|^2 \propto 2 + \\ \exp[j(\omega 1 - \omega 2)t - j(k1 - k2)Lwg - j\phi] + \\ \exp[j(\omega 2 - \omega 1)t - j(k2 - k1)Lwg - j\phi] \\ = 2 + \cos[(\omega 1 - \omega 2)t - (k1 - k2)Lwg - \phi]$$ (1)

From equation (1), it is apparent that the amplitude of the optical beat signal has a difference frequency (=beat frequency) and the phase delay in the modulator waveguide becomes (k1−k2)Lwg+φ.

The wave numbers k1 and k2 in the phase modulator are functions of a modulation voltage Vm. The phase rotation (delay) can be rewritten into:

[Mathematical 2]

$$\Phi(\lambda, Vm) + \Phi(\lambda, Vm=0) = k(\lambda, Vm)Lwg$$ (2)

A phase change amount Φ(λ, Vm) from Φ(λ, Vm=0) at zero bias is a parameter obtained as a measured value in a semiconductor phase modulator.

Of the phase terms in equation (2), a term containing Vm (phase adjustable portion) is given by:

[Mathematical 3]

$$(k1-k2)Lwg = \Delta\Phi(Vm) = \varphi 1(\lambda 1, Vm) - \Phi 2(\lambda 2, Vm)$$ (3)

This reveals that the phase delay of the optical beat signal is given by the difference between the phase delays of the λ1 signal and λ2 signal.

A change of the phase of the optical beat signal depending on Vm is calculated for a typical semiconductor phase modulator. The half-wave voltage Vπ of the phase modulator has wavelength dependence, and the phase change is given by:

[Mathematical 4]

$$\Phi(\lambda, Vm) = \pi \times \frac{Vm}{V\pi(\lambda)}$$ (4)

and the phase delays by π when Vm is given.

Vπ changes linearly upon a wavelength change experimentally, and thus can be approximated by:

[Mathematical 5]

$$V\pi(\lambda) = V\pi 0 + \frac{\Delta V\pi}{\Delta \lambda} \times (\lambda - \lambda 0)$$ (5)

Figure 2:
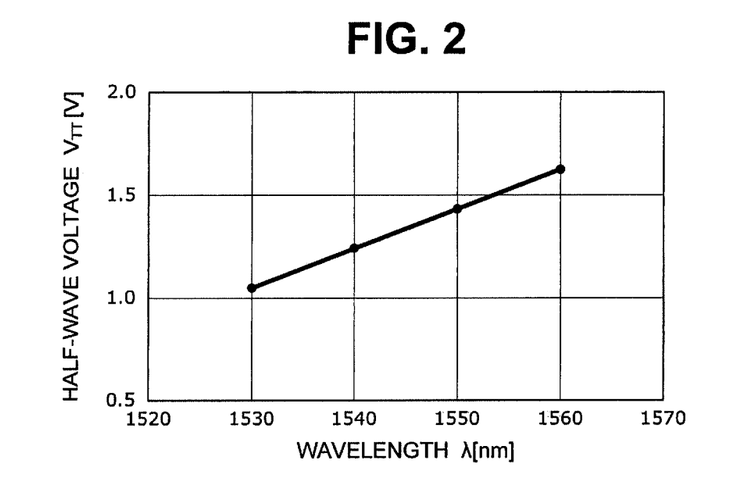
FIG. 2 is a graph showing an example of the wavelength dependence of a half-wave voltage in a semiconductor modulator.

Numerical values can be obtained for a set of Vπ0, λ0, and ΔVπ/Δλ. As shown in FIG. 2, Vπ is almost linear in the wavelength range of 1530 to 1560 [nm].

Consequently, the phase change of the beat signal is given by:

[Mathematical 6]

$$\Delta\Phi(Vm) = \pi \times Vm\left(\frac{1}{V\pi(\lambda 1)} - \frac{1}{V\pi(\lambda 2)}\right)$$ (6)

Figure 3:
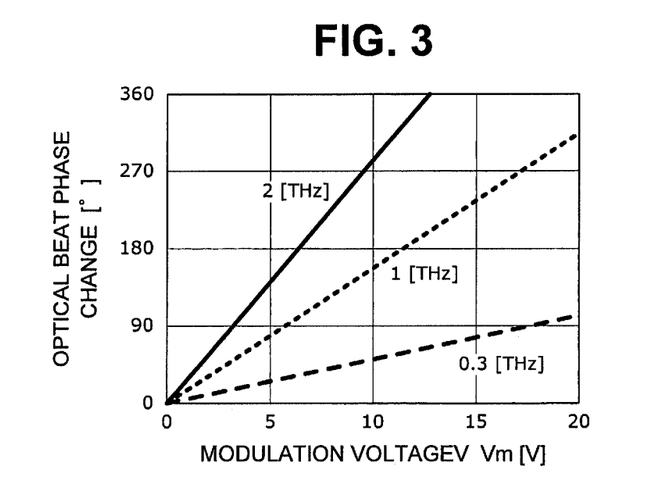
FIG. 3 is a graph showing the phase change of an optical beat signal.

FIG. 3 shows the phase change of the optical beat signal that is calculated from equation (6) using the voltage dependence of Vπ(λ) obtained from FIG. 2. In this calculation, the beat frequency is changed by fixing λ1=1540 [nm] and changing λ2.

As is apparent from FIG. 3, for 0.3 [THz], the phase changes by only about 50° even at the modulation voltage Vm=10 [V]. However, in the regions of 1 [THz] and 2 [THz], the phase can change by 100° or more even at the same modulation voltage of 10 [V].

In the opto-electronic integrated circuit 10 of FIG. 1, the lengths of all waveguides including the optical phase modulators 15A to 15D are basically equalized. In practice, however, the lengths slightly shift from the equal length state expressed by φ in equation (1) owing to variations of the semiconductor process. By adjusting the modulator voltage, this shift can be corrected, and an arbitrary optical beat phase change can be given with respect to the optical beat signal.

As for beat output phase adjustment of the respective optical phase modulators 15A to 15D, it suffices to ensure a modulation voltage width capable of giving a phase change of a maximum of 180°. For example, the phase changes by 180° at about 12 [V] for 1 [THz] in FIG. 3. Thus, the phases of branched optical beat signals are adjusted in a voltage range of 0 [V] to 12 [V], and the phase relationship can be controlled between the antennas.

The wavelength dependence of the half-wave voltage Vπ used here is merely an example. It can be predicted that Vπ can be decreased to ⅓ to ⅕ in comparison with the embodiment by optimizing the phase modulator waveguide structure. Hence, the phase of the optical beat signal can be adjusted at a lower modulation voltage Vm.

[Effects of First Embodiment]

As described above, a conventional opto-electronic integrated circuit constitutes a phased array antenna for controlling the radiation direction, as shown in FIG. 8 described above. The conventional opto-electronic integrated circuit is configured so that independent phase control becomes possible for an optical beat signal obtained by multiplexing two optical signals of different wavelengths. The conventional opto-electronic integrated circuit supplies phase-controlled electrical signals to four antennas.

This configuration requires phase modulators for two respective optical signals of different wavelengths. Thus, after two optical signals are input from two independent input ports and phase-controlled, they need to be multiplexed. Since the optical signals are amplified at a preceding stage by using independent fiber amplifiers for the two respective optical signals, a polarization adjustment unit is required to uniform the polarization states of the two optical signals.

To the contrary, in the opto-electronic integrated circuit 10 according to the embodiment, the optical beat signal S obtained by multiplexing two optical signals of different wavelengths by the multiplexer C is branched into a plurality of optical beat signals by the 1×2 optical splitters 12, 13A, and 13B. The optical phase modulators 15A to 15D adjust the phases of the respective optical beat signals based on a phase modulation characteristic in which the phase change amount changes depending on the wavelength of light, i.e., a phase modulation characteristic having wavelength dispersion. Then, the optical beat signals are coupled to the individual OE conversion devices.

More specifically, the photodiodes 17 are used as the OE conversion devices. Electrical signals output from the photodiodes 17 based on the input optical beat signals are supplied to the respective antenna devices 18.

Thus, the opto-electronic integrated circuit 10 can control the relative phase difference between two optical signals of different wavelengths, i.e., the λ1 signal and λ2 signal contained in the input optical beat signal S, and input the optical beat signal S in the optical beat state in which the λ1 signal and λ2 signal are multiplexed. Since only one fiber amplifier suffices when amplifying an optical signal, a polarization adjustment unit can be omitted.

Accordingly, degradation of the optical beat state accompanying the fiber amplifier can be suppressed, and a stable optical beat signal can be generated. The numbers of circuits such as optical splitters, 3-dB couplers, and phase modulators can be almost halved, simplifying the optical signal distribution circuit.

The chip size can be reduced, and photodiodes and array antennas can be integrated on a common substrate.

[Second Embodiment]

Figure 4:
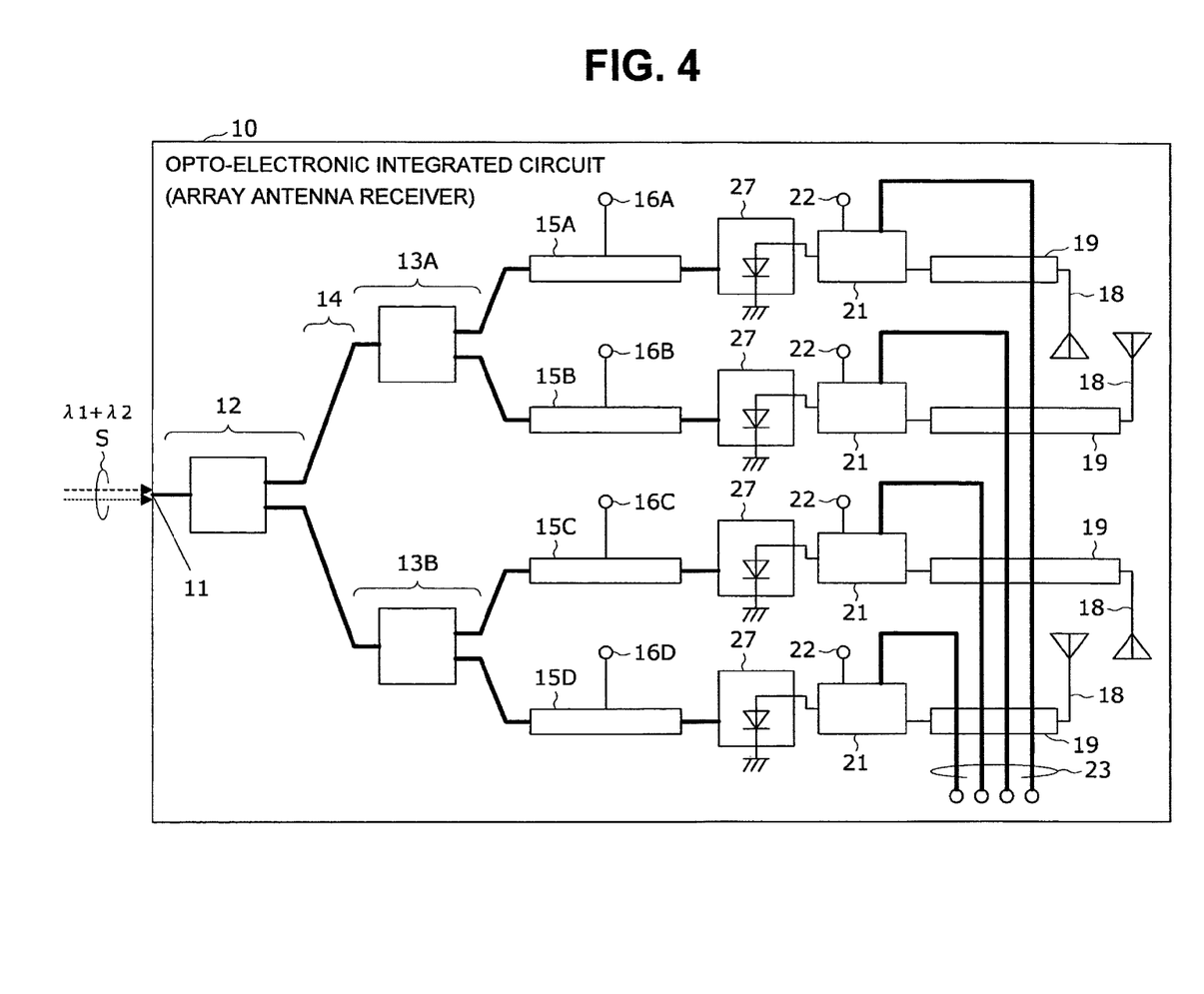
FIG. 4 is a circuit diagram showing the configuration of an opto-electronic integrated circuit according to the second embodiment.

Next, an opto-electronic integrated circuit 10 according to the second embodiment of the present invention will be described with reference to FIG. 4.

As an example of the opto-electronic integrated circuit 10, the embodiment will explain an array antenna receiver which uses photodiodes as terahertz wave receiver devices.

In the opto-electronic integrated circuit 10 according to the embodiment, electrical input/output circuits 21, photodiode bias terminals 22 connected to the electrical input/output circuits 21, low-frequency electrical signal output lines 23, and photodiodes 27 are integrated as main circuit units on an InP substrate, in addition to an optical beat signal input port 11, 1×2 optical splitters 12, 13A, and 13B, connection waveguides 14, optical phase modulators 15A to 15D, phase control voltage terminals 16A to 16D, antenna devices 18, and electrical lines 19, similar to the first embodiment.

The antenna devices 18 are arranged for the respective photodiodes (OE conversion devices) 27, and have a function of operating as a phased array antenna as a whole.

The electrical input/output circuits 21 are arranged for the respective photodiodes 27, and have a function of demodulating, by electrical signals which have been output from the photodiodes 27 and have individual phases, received signals radio-received by the corresponding antenna devices 18, and outputting the obtained demodulation signals.

In the embodiment, the photodiode 27 functions as a nonlinear receiver device. To operate the opto-electronic integrated circuit 10, the DC bias of a proper photodiode is applied to the photodiode bias terminal 22, and an optical beat signal is introduced from the optical beat signal input port 11, thereby generating a terahertz wave signal in the photodiode. This is equivalent to a state in which a local signal is supplied to a nonlinear microwave device.

Terahertz wave signals received from antennas 18 are introduced into the photodiodes via the electrical input/output circuits 21 and undergo a frequency mixing operation (demodulation operation). Low-frequency modulation signals (IF signals) superimposed on the received terahertz wave signals are extracted as IF signals by homodyne reception or heterodyne reception, and the received signals are output from the low-frequency electrical signal output lines 23 connected to the electrical input/output circuits 21.

The electrical input/output circuit 21 desirably has the function of a directional coupler for a terahertz wave signal, which is not essential. That is, some applications require a circuit configuration in which a local signal generated from an optical beat signal is cut off on the antenna side and a terahertz wave signal received from the antenna reaches the photodiode.

The local signal is generated from an optical beat signal to the photodiode, and adjustment of the phase is the same as that in the first and second embodiments. The phase relationship between the respective antennas is adjusted to perform an appropriate reception operation of the array antennas.

[Third Embodiment]

Figure 5:
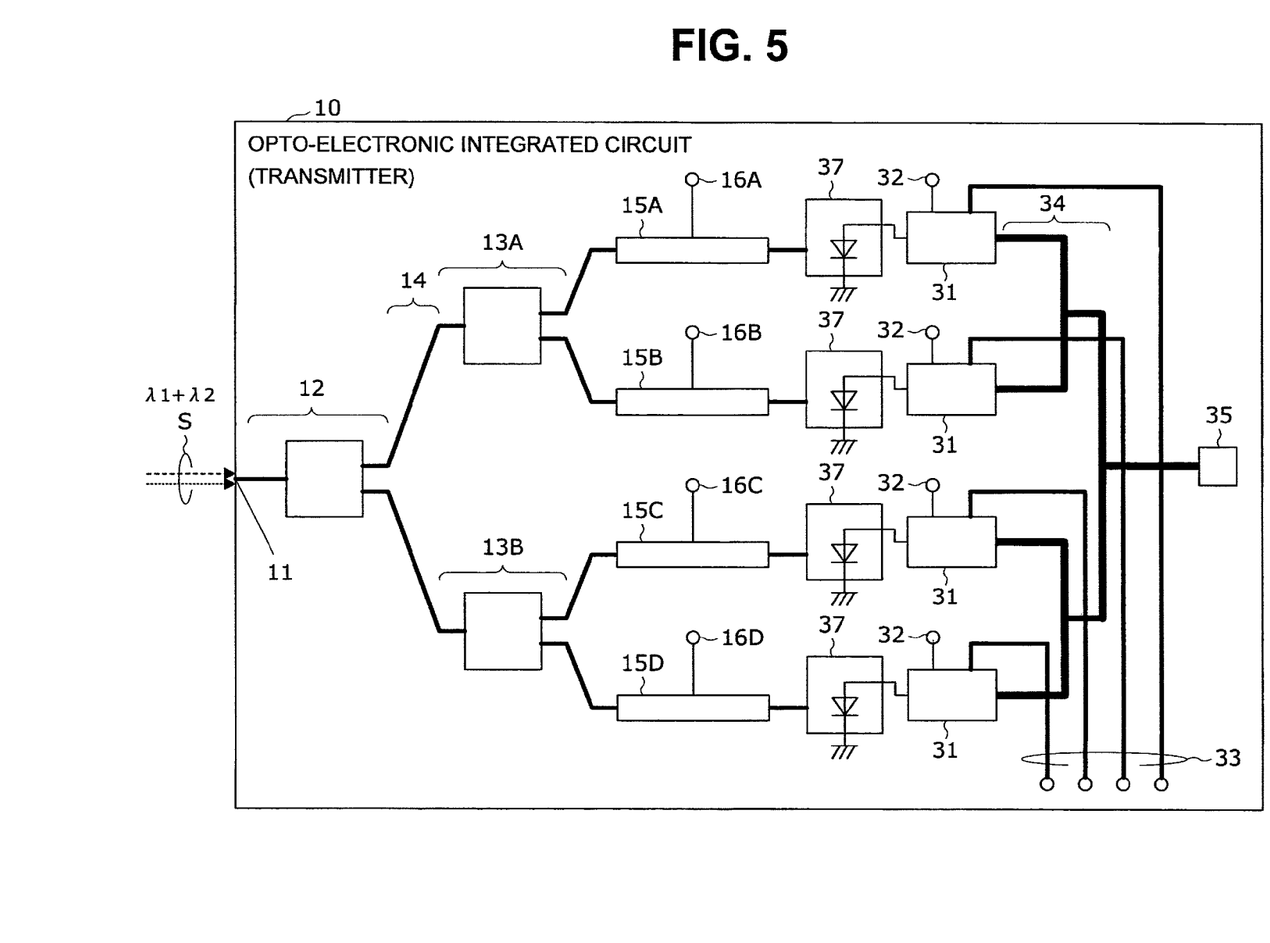
FIG. 5 is a circuit diagram showing the configuration of an opto-electronic integrated circuit according to the third embodiment.

Next, an opto-electronic integrated circuit 10 according to the third embodiment of the present invention will be described with reference to FIG. 5.

As an example of the opto-electronic integrated circuit 10, the embodiment will explain a transmitter in which the antenna output form in the second embodiment is replaced with an electrical line output form and a signal is transmitted by a terahertz carrier wave.

In the opto-electronic integrated circuit 10 according to the embodiment, electrical input/output circuits 31, photodiode bias terminals 32 connected to the electrical input/output circuits 31, low-frequency electrical signal input lines 33, terahertz wave power combining lines 34, a terahertz wave signal output port 35, and photodiodes 37 are integrated as main circuit units on an InP substrate, in addition to an optical beat signal input port 11, 1×2 optical splitters 12, 13A, and 13B, connection waveguides 14, optical phase modulators 15A to 15D, and phase control voltage terminals 16A to 16D, similar to the first embodiment.

The electrical input/output circuits 31 are arranged for the respective photodiodes (OE conversion devices) 37, and have a function of modulating, by input modulation signals, electrical signals which have been output from the photodiodes 37 and have individual phases, and outputting the obtained transmission signals.

The terahertz wave power combining lines (power combining lines) 34 have a function of power-combining transmission signals output from the respective electrical input/output circuits 31 and outputting them.

To operate the opto-electronic integrated circuit 10 according to the embodiment, an optical beat signal is introduced from the optical beat signal input port 11 to generate terahertz wave signals in the photodiodes 37. The operation voltages of the photodiodes 37 are changed by signals introduced from the low-frequency electrical signal input lines 33, thereby obtaining modulated terahertz wave signals.

The electrical input/output circuit 31 interposed between the photodiode 37 and the terahertz wave power combining line 34 desirably has a filter function. More specifically, a signal introduced from the low-frequency electrical signal input line 33 propagates to only the side of the photodiode 37 and is cut off on the terahertz wave output side. At the same time, a terahertz wave signal output is cut off on the side of the low-frequency electrical signal input line 33 and photodiode bias terminal 32.

In the embodiment, the phases of terahertz wave outputs from the photodiodes 37 are adjusted so that they coincide with each other. The phases can be easily controlled by the optical phase modulators 15A to 15D, similar to the first and second embodiments.

[Extension of Embodiments]

The present invention has been explained by referring to the embodiments, but is not limited to the above-described embodiments. It will readily occur to those skilled in the art that various changes can be made for the arrangement and details of the present invention without departing from the scope of the invention. The embodiments can be arbitrarily combined and practiced compatibly.

EXPLANATION OF THE REFERENCE NUMERALS AND SIGNS

10 . . . opto-electronic integrated circuit, 12, 13A, 13B . . . 1×2 optical splitter, 15A-15D . . . optical phase modulator, 17, 27, 37 . . . photodiode, 18 . . . antenna device, 21, 31 . . . electrical input/output circuit

The invention claimed is:

1. An opto-electronic integrated circuit comprising:
   an optical splitter formed on a substrate, the optical splitter branching an input optical beat signal, which is in a terahertz wave region and is obtained by multiplexing two optical signals of different wavelengths, into N (N is an integer of not less than 2) optical beat signals, and outputting the optical beat signals; and
   N optical phase modulators formed on the substrate for the respective optical beat signals output from the optical splitter, the optical phase modulators having a phase modulation characteristic which causes a phase change amount to be changed depending on a wavelength of light, and phases of the optical beat signals which are in the terahertz wave region are adjusted and output from the optical splitter based on the characteristic.

2. An opto-electronic integrated circuit according to claim 1, further comprising:
   N OE conversion devices formed on the substrate for the respective optical phase modulators, the OE conversion devices outputting electrical signals obtained by OE-converting the optical beat signals that have been output from the optical phase modulators and have individual phases.

3. An opto-electronic integrated circuit according to claim 2, further comprising:
   N antenna devices formed on the substrate for the respective OE conversion devices, the antenna devices operating as a phased array antenna as a whole by radio-transmitting the electrical signals that have been output from the OE conversion devices and have individual phases.

4. An opto-electronic integrated circuit comprising:
   an optical splitter formed on a substrate, the optical splitter branching an input optical beat signal, which is in a terahertz wave region and is obtained by multiplexing two optical signals of different wavelengths, into N (N is an integer of not less than 2) optical beat signals, and outputting the optical beat signals;
   N optical phase modulators formed on the substrate for the respective optical beat signals output from the optical splitter, the optical phase modulators having a phase modulation characteristic which causes a phase change amount to be changed depending on a wavelength of light, and phases of the optical beat signals which are in the terahertz wave region are adjusted and output from the optical splitter based on the characteristic;
   N OE conversion devices formed on the substrate for the respective optical phase modulators, the OE conversion devices outputting electrical signals obtained by OE-converting the optical signals that have been output from the optical phase modulators and have individual phases;

N antenna devices formed on the substrate for the respective OE conversion devices, the antenna devices operating as a phased array antenna as a whole; and N electrical input/output circuits formed on the substrate for the respective OE conversion devices, the electrical input/output circuits outputting demodulation signals obtained by demodulating, by the electrical signals that have been output from the OE conversion devices and have individual phases, received signals radio-received by the antenna devices.

5. An opto-electronic integrated circuit comprising:

an optical splitter formed on a substrate, the optical splitter branching an input optical beat signal, which is in a terahertz wave region and is obtained by multiplexing two optical signals of different wavelengths, into N (N is an integer of not less than 2) optical beat signals, and outputting the optical beat signals;

N optical phase modulators formed on the substrate for the respective optical beat signals output from the optical splitter, the optical phase modulators having a phase modulation characteristic which causes a phase change amount to be changed depending on a wavelength of light, and phases of the optical beat signals which are in the terahertz wave region are adjusted and output from the optical splitter based on the characteristic;

N OE conversion devices formed on the substrate for the respective optical phase modulators, the OE conversion devices outputting electrical signals obtained by OE-converting the optical signals that have been output from the optical phase modulators and have individual phases;

N electrical input/output circuits formed on the substrate for the respective OE conversion devices, the electrical input/output circuits outputting transmission signals obtained by modulating, by input modulation signals, the electrical signals that have been output from the OE conversion devices and have individual phases; and power combining lines formed on the substrate, the power combining lines power-combining and outputting the N transmission signals output from the electrical input/output circuits.

6. An array antenna transmitter comprising:

an optical splitter formed on a substrate, the optical splitter branching an input optical beat signal, which is in a terahertz wave region and is obtained by multiplexing two optical signals of different wavelengths, into N (N is an integer of not less than 2) optical beat signals, and outputting the optical beat signals; and N optical phase modulators formed on the substrate for the respective optical beat signals output from the optical splitter, the optical phase modulators having a phase modulation characteristic which causes a phase change amount to be changed depending on a wavelength of light, and phases of the optical beat signals which are in the terahertz wave region are adjusted and output from the optical splitter based on the characteristic;

N photodiodes formed on the substrate for the respective optical phase modulators, the photodiodes outputting electrical signals obtained by OE-converting the optical beat signals that have been output from the optical phase modulators and have individual phases; and N antenna devices formed on the substrate for the respective photodiodes, the antenna devices operating as a phased array antenna as a whole by radio-transmitting the electrical signals that have been output from the photodiodes and have individual phases.

7. An array antenna receiver comprising:

an optical splitter formed on a substrate, the optical splitter branching an input optical beat signal, which is in a terahertz wave region and is obtained by multiplexing two optical signals of different wavelengths, into N (N is an integer of not less than 2) optical beat signals, and outputting the optical beat signals; and N optical phase modulators formed on the substrate for the respective optical beat signals output from the optical splitter, the optical phase modulators having a phase modulation characteristic which causes a phase change amount to be changed depending on a wavelength of light, and phases of the optical beat signals which are in the terahertz wave region are adjusted and output from the optical splitter based on the characteristic;

N photodiodes formed on the substrate for the respective optical phase modulators, the photodiodes outputting electrical signals obtained by OE-converting the optical signals that have been output from the optical phase modulators and have individual phases;

N antenna devices formed on the substrate for the respective photodiodes, the antenna devices operating as a phased array antenna as a whole; and N electrical input/output circuits formed on the substrate for the respective photodiodes, the electrical input/output circuits outputting demodulation signals obtained by demodulating, by the electrical signals that have been output from the photodiodes and have individual phases, received signals radio-received by the antenna devices.

8. A transmitter comprising:

an optical splitter formed on a substrate, the optical splitter branching an input optical beat signal, which is in a terahertz wave region and is obtained by multiplexing two optical signals of different wavelengths, into N (N is an integer of not less than 2) optical beat signals, and outputting the optical beat signals; and N optical phase modulators formed on the substrate for the respective optical beat signals output from the optical splitter, the optical phase modulators having a phase modulation characteristic which causes a phase change amount to be changed depending on a wavelength of light, and phases of the optical beat signals which are in the terahertz wave region are adjusted and output from the optical splitter based on the characteristic;

N photodiodes formed on the substrate for the respective optical phase modulators, the photodiodes outputting electrical signals obtained by OE-converting the optical signals that have been output from the optical phase modulators and have individual phases;

N electrical input/output circuits formed on the substrate for the respective photodiodes, the electrical input/output circuits outputting transmission signals obtained by modulating, by input modulation signals, the electrical signals that have been output from the photodiodes and have individual phases; and power combining lines formed on the substrate, the power combining lines power-combining and outputting the N transmission signals output from the electrical input/output circuits.

9. An opto-electronic integrated circuit comprising:

a multiplexer configured to multiplex input signals;

an optical splitter formed on a substrate, the optical splitter branching an input optical beat signal, which is in a terahertz wave region and is obtained by multiplexing two optical signals of different wavelengths, into N, N being an integer of not less than 2, optical beat signals, and outputting the optical beat signals; and N optical phase modulators formed on the substrate for the respective optical beat signals output from the optical splitter, the optical phase modulators having a phase modulation characteristic which causes a phase change amount to be changed depending on a wavelength of light, and phases of the optical beat signals which are in the terahertz wave region are adjusted and output from the optical splitter based on the characteristic.

* * * * *